US012012018B2

(12) United States Patent
Hu et al.

(10) Patent No.: US 12,012,018 B2
(45) Date of Patent: Jun. 18, 2024

(54) WELCOMING SLIDE RAIL

(71) Applicant: KEIPER SEATING MECHANISMS CO., LTD, Shanghai (CN)

(72) Inventors: Haila Hu, Shanghai (CN); Weiwei Li, Shanghai (CN); Dong Liu, Shanghai (CN)

(73) Assignee: KEIPER SEATING MECHANISMS CO., LTD, Shanghai (CN)

( * ) Notice: Subject to any disclaimer, the term of this patent is extended or adjusted under 35 U.S.C. 154(b) by 305 days.

(21) Appl. No.: 17/732,514

(22) Filed: Apr. 29, 2022

(65) Prior Publication Data

US 2022/0266725 A1 Aug. 25, 2022

Related U.S. Application Data

(63) Continuation of application No. PCT/CN2020/100773, filed on Jul. 8, 2020.

(30) Foreign Application Priority Data

Oct. 29, 2019 (CN) .......................... 201911037107.2

(51) Int. Cl.
*B60N 2/06* (2006.01)
*B60N 2/07* (2006.01)
*B60N 2/14* (2006.01)

(52) U.S. Cl.
CPC ........... *B60N 2/0745* (2013.01); *B60N 2/067* (2013.01); *B60N 2/14* (2013.01)

(58) Field of Classification Search
CPC ............... B60R 7/04; B60R 2011/0007; B60R 2011/008; B60R 2021/23161;

(Continued)

(56) References Cited

U.S. PATENT DOCUMENTS

| 7,422,264 B1 * | 9/2008 | Lung ........................ B60N 2/06 296/65.01 |
| 8,936,295 B2 * | 1/2015 | Slungare ............ B60N 2/02246 297/344.21 |

(Continued)

FOREIGN PATENT DOCUMENTS

| CN | 201333952 | 10/2009 |
| CN | 102971182 | 3/2013 |
| CN | 110774950 | 2/2020 |

OTHER PUBLICATIONS

"International Search Report (Form PCT/ISA/210) of PCT/CN2020/100773", mailed on Oct. 12, 2020, pp. 1-5.

(Continued)

*Primary Examiner* — Pinel E Romain
(74) *Attorney, Agent, or Firm* — JCIPRNET (57) ABSTRACT

A welcoming slide rail, mounted at the bottom of a seat, the welcoming slide rail including: a slide rail assembly, including a left slide rail and a right slide rail, the left slide rail including a left upper rail and a left lower rail, the right slide rail including a right upper rail and a right lower rail, the left upper rail and the left lower rail being in sliding connection by a left motor, and the right upper rail and the right lower rail being in sliding connection by a right motor; and a rotating mechanism, including a wall plate, first, second and third main rotation points, and first and second auxiliary supporting points, the wall plate being fixedly connected to the bottom of the seat.

10 Claims, 5 Drawing Sheets

(58) Field of Classification Search
CPC ........ B60R 16/02; B60N 2/773; B60N 2/793; B60N 2/0272; B60N 2/0264; B60N 2/01; B60N 2/753; B60N 3/002; B60N 2/0244
USPC .................................. 296/65.15; 297/344.22
See application file for complete search history.

(56) References Cited

U.S. PATENT DOCUMENTS

| | | | |
|---|---|---|---|
| 9,114,733 B2* | 8/2015 | Pluta | B60N 2/14 |
| 11,059,393 B2* | 7/2021 | Slungare | B60N 2/06 |
| 2019/0135138 A1 | 5/2019 | Duhamel et al. | |
| 2019/0143849 A1 | 5/2019 | Murakami et al. | |

OTHER PUBLICATIONS

"Written Opinion of the International Searching Authourity (Form/ISA/237) of PCT/CN2020/100773", mailed on Oct. 13, 2020, pp. 1-5.

* cited by examiner

WELCOMING SLIDE RAIL

CROSS-REFERENCE TO RELATED APPLICATION

This application is a continuation of international application of PCT application serial No. PCT/CN2020/100773, filed on Jul. 8, 2020, which claims the priority benefit of China application No. 201911037107.2, filed on Oct. 29, 2019. The entirety of each of the above mentioned patent applications is hereby incorporated by reference herein and made a part of this specification.

BACKGROUND OF THE INVENTION

Technical Field

The present invention relates to the technical field of automobile seat, and in particular to a welcoming slide rail for an automobile seat.

Description of Related Art

In the prior art, more and more automobile seats have a function of rotation for welcoming, but generally, the seat has the following problems: if a solution of a rotating turntable is adopted, although a rotation angle is large, the seat is heavy and bulky, and is not suitable for the use of a car. If a solution of a connecting rod or a common small angle rotation is adopted, although weight and volume meet requirements, a rotation angle is too small. Therefore, in view of a compact space of a car or a sedan, how to achieve a more comfortable angle to welcome a guest into an automobile by changing a structure of a slide rail is a technical problem that needs to be solved urgently.

BRIEF SUMMARY OF THE INVENTION

The present invention mainly solves the technical problems in the prior art to provide a welcoming slide rail with a comfortable welcoming angle, a compact structure, and high strength.

The present invention provides a welcoming slide rail, mounted at the bottom of a seat, the welcoming slide rail including:

a slide rail assembly, including a left slide rail and a right slide rail, the left slide rail including a left upper rail and a left lower rail, the right slide rail including a right upper rail and a right lower rail, the left upper rail and the left lower rail being in sliding connection by means of a left motor, and the right upper rail and the right lower rail being in sliding connection by means of a right motor; and a rotating mechanism, including a wall plate, first, second and third main rotation points, and first and second auxiliary supporting points, the wall plate being fixedly connected to the bottom of the seat; the first main rotation point comprises a first bracket and a first rotating mechanism, a lower part of the first bracket being connected to the left upper rail, an upper part of the first bracket being rotatably connected to the wall plate via the first rotating mechanism; the second main rotation point comprises a second bracket and a second rotating mechanism, a lower part of the second bracket being rotatably connected to the right upper rail, one side of an upper part of the second bracket being rotatably connected to the wall plate via the second rotating mechanism; the third main rotation point comprises a third rotating mechanism, the other side of the upper part of the second bracket being rotatably connected to the right upper rail via a third rotating mechanism; the first auxiliary supporting point comprises a third bracket and a fourth rotating mechanism, a lower part of the third bracket being connected to the left upper rail, an upper part of the third bracket being rotatably connected to the wall plate via the fourth rotating mechanism; the second auxiliary supporting point comprises a fourth bracket and a fifth rotating mechanism, a lower part of the fourth bracket being connected to the right upper rail, and an upper part of the fourth bracket being rotatably connected to the wall plate via the fifth rotating mechanism; wherein when running speeds of the left motor and the right motor are consistent, the seat moves forward or backward in parallel along the slide rail assembly; when a backward speed of the left motor is less than a backward speed of the right motor, the second bracket moves backwards, driving the third main rotation point and the second main rotation point to move backwards, at the same time, the second bracket starts to rotate around the third main rotation point, and a distance of the second bracket from the first main rotation point is gradually made larger, so that the wall plate is driven to start to rotate counterclockwise around the second main rotation point, and the first and second auxiliary supporting points move along the third bracket and the fourth bracket respectively, so that the seat is rotated relative to the slide rail assembly to a set angle.

Further, the first rotating mechanism includes a first step bolt, a first chuck bushing, and a first gasket; the first step bolt passes through the wall plate and the first gasket in sequence and is connected to the first bracket, and the first chuck bushing is arranged between the wall plate and the first step bolt.

Further, the second rotating mechanism includes a second step bolt, a second chuck bushing, a second gasket, and a first nut; the second step bolt is connected to the first nut after passing through the wall plate, the second gasket, and the second bracket in sequence, and the second chuck bushing is arranged between the wall plate and the second step bolt.

Further, the third rotating mechanism includes a third step bolt, a third chuck bushing, and a third gasket; the third step bolt is connected to the right upper rail after passing through the second bracket and the third gasket in sequence, and the third chuck bushing is arranged between the second bracket and the third step bolt.

Further, the fourth rotating mechanism includes a fourth step bolt, a fourth chuck bushing, a fourth gasket, and a second nut; the fourth step bolt is connected to the second nut after passing through the third bracket, the fourth gasket, and the wall plate in sequence, and the fourth chuck bushing is arranged between the third bracket and the fourth step bolt.

Further, the fifth rotating mechanism includes a fifth step bolt, a fifth chuck bushing, a fifth gasket, and a third nut; the fifth step bolt is connected to the third nut after passing through the fourth bracket, the fifth gasket, and the wall plate in sequence, and the fifth chuck bushing is arranged between the fourth bracket and the fifth step bolt.

Further, a first curved slide chute is provided inside the third bracket, and the fourth step bolt passes through and is arranged in the first curved slide chute.

Further, a second curved slide chute is provided inside the fourth bracket, and the fifth step bolt passes through and is arranged in the second curved slide chute.

Further, a set angle of the seat rotated relative to the slide rail assembly is 0-45°.

Further, the left motor and the right motor are both connected to a motor controller. The motor controller is configured to control the left motor and the right motor to act synchronously or independently, and the left motor and the right motor have speed and position feedback functions.

The present invention has the beneficial effects of:

1) being able to achieve a comfortable 45-degree rotation for welcoming;

2) being suitable for a compact space of a car, and meeting ultra-thin requirements for a rotating mechanism;

3) achieving front and rear synchronization and memory reset of left and right slide rails; and 4) that two main rotation points are on the left and right slide rails respectively during rotation, facilitating better strength performance compared with an ordinary small-angle rotating mechanism.

DETAILED DESCRIPTION OF THE INVENTION

With reference to FIGS. 1-11, the present invention relates to a welcoming slide rail, mounted at the bottom of a seat 1, the slide rail including:

a slide rail assembly, including a left slide rail 2 and a right slide rail 3, the left slide rail 2 including a left upper rail 21 and a left lower rail 22, the right slide rail 3 including a right upper rail 31 and a right lower rail 32, the left upper rail 21 and the left lower rail 22 being in sliding connection by means of a left motor 23, and the right upper rail 31 and the right lower rail 32 being in sliding connection by means of a right motor 33; and a rotating mechanism 4, including a wall plate 46, first, second and third main rotation points 41-43, and first and second auxiliary supporting points 44-45, the wall plate 46 being fixedly connected to the bottom of the seat 1, the first main rotation point 41 including a first bracket 411 and a first rotating mechanism, a lower part of the first bracket 411 being connected to the left upper rail 21, an upper part of the first bracket 411 being rotatably connected to the wall plate 46 via the first rotating mechanism; the second main rotation point 42 includes a second bracket 421 and a second rotating mechanism, a lower part of the second bracket 421 being rotatably connected to the right upper rail 31, one side of an upper part of the second bracket 421 being rotatably connected to the wall plate 46 via the second rotating mechanism; the third main rotation point 43 includes a third rotating mechanism, the other side of the upper part of the second bracket 421 being rotatably connected to the right upper rail 31 via a third rotating mechanism; the first auxiliary supporting point 44 includes a third bracket 441 and a fourth rotating mechanism, a lower part of the third bracket 441 being connected to the left upper rail 21, an upper part of the third bracket 441 being rotatably connected to the wall plate 46 via the fourth rotating mechanism; the second auxiliary supporting point 45 includes a fourth bracket 451 and a fifth rotating mechanism, a lower part of the fourth bracket 451 being connected to the right upper rail 31, and an upper part of the fourth bracket 451 being rotatably connected to the wall plate 46 via the fifth rotating mechanism.

Figure 1:
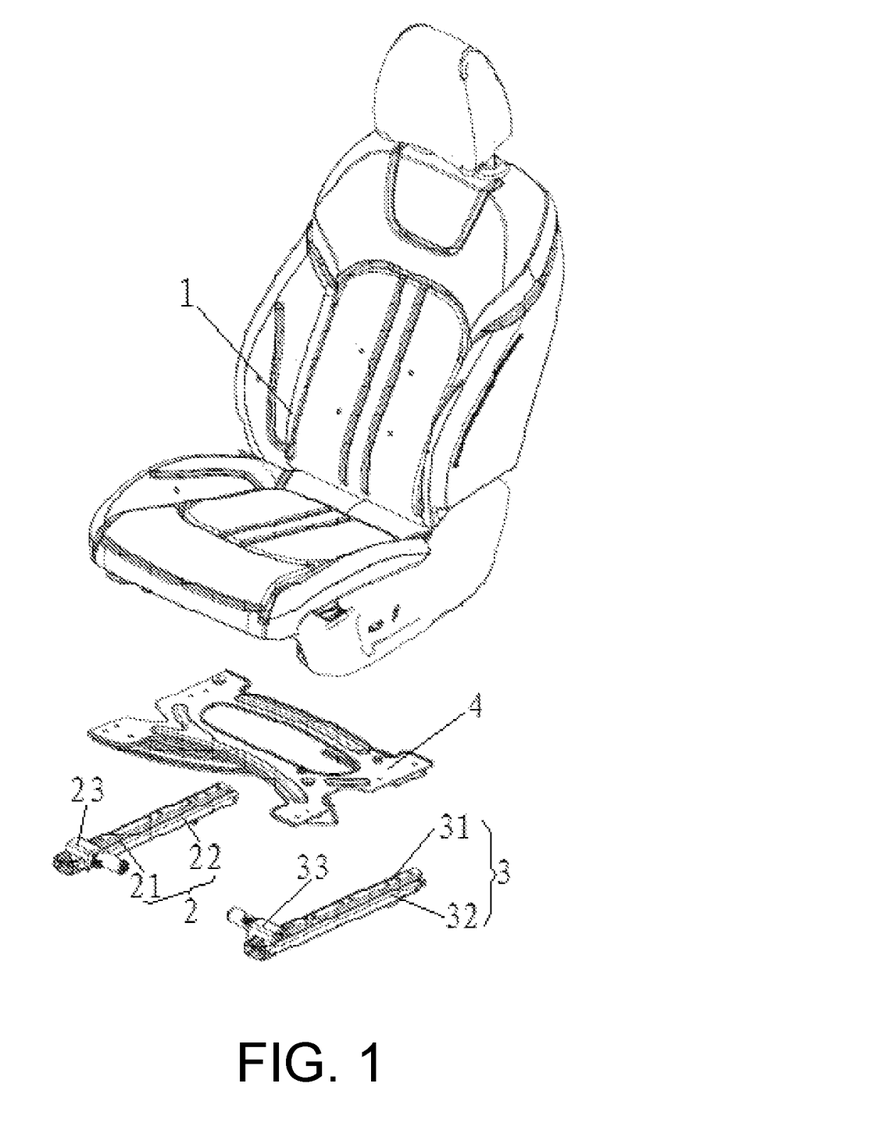
FIG. 1 is a schematic structure diagram of a welcoming slide rail of the present invention.

When running speeds of the left motor 23 and the right motor 33 are consistent, the seat 1 moves forward or backward in parallel along the slide rail assembly. That is, in this embodiment: a backward movement speed of the left upper rail 21 is equal to that of the right upper rail 31. Distances between the first, second and third main rotation points 41-43 are kept stable, thereby driving the wall plate 46 to move backwards stably without rotation. In addition, in the whole process, the first and second auxiliary supporting points 44-45 are in initial positions on the third bracket 441 and the fourth bracket 451, so as to realize auxiliary hinge point support and improve strength performance ability.

Figure 2:
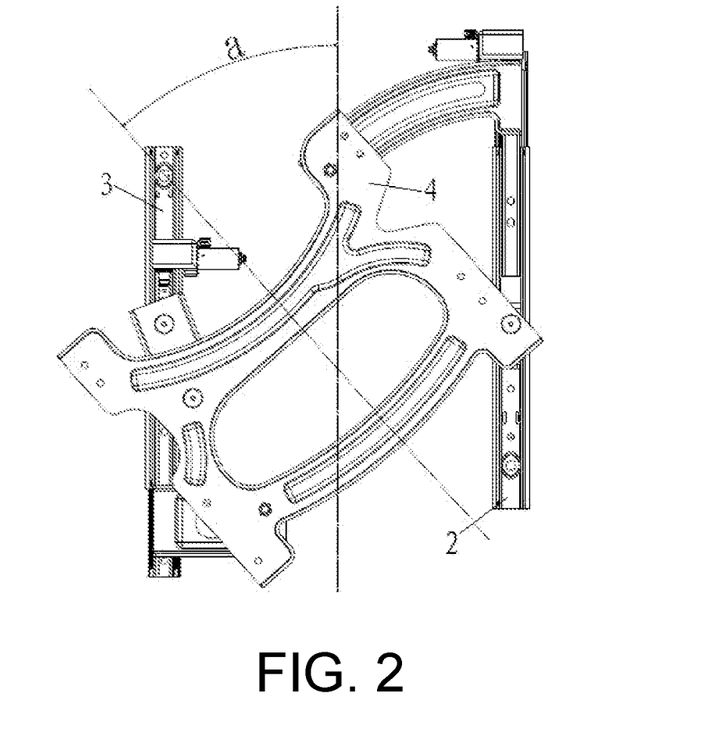
FIG. 2 is a schematic diagram of a welcoming slide rail rotated to a welcoming state of the present invention.

When a backward speed of the left motor 23 is less than a backward speed of the right motor 33, the second bracket 421 moves backwards, driving the third main rotation point 43 and the second main rotation point 42 to move backwards. At the same time, the second bracket 421 starts to rotate around the third main rotation point 43, and a distance of the second bracket 421 from the first main rotation point 41 is gradually made larger, so that the wall plate 46 is driven to start to rotate counterclockwise around the second main rotation point 42, and the first and second auxiliary supporting points 44-45 move along the third bracket 441 and the fourth bracket 451 respectively, so that the seat 1 is rotated by a set angle relative to the slide rail assembly. Preferably, the set angle of the seat 1 rotated relative to the slide rail assembly is preferably 0-45°.

Figure 3:
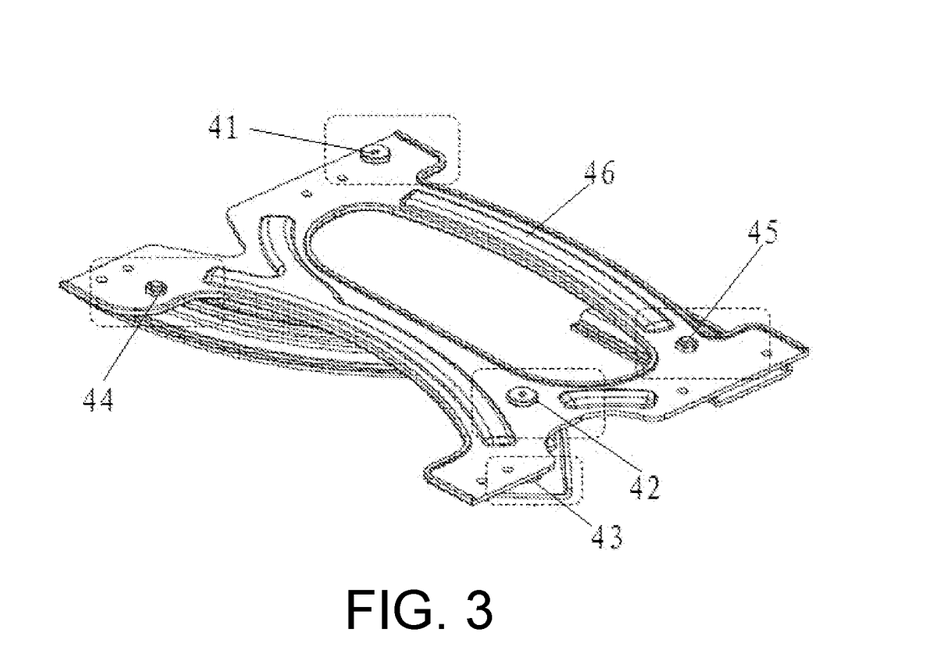
FIG. 3 is a schematic structure diagram of a rotating mechanism of a welcoming slide rail of the present invention.
Figure 4:
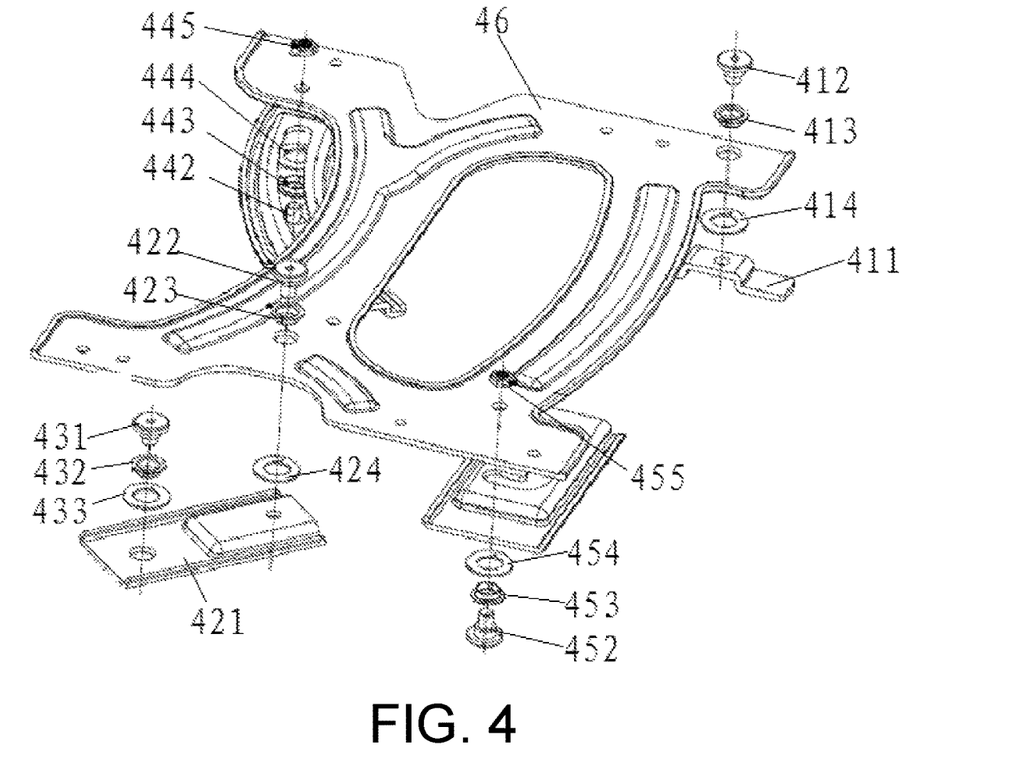
FIG. 4 is an exploded diagram of a rotating mechanism of a welcoming slide rail of the present invention.

In the present invention, the first, second and third main rotation points 41-43 are main stress points. The first and second auxiliary supporting points 44-45 are secondary stress points. The first and second auxiliary supporting points 44-45 of the present invention can improve structural strength, additionally provide bracket support at an extreme position, improve rigidity, and reduce sinking deformation of the seat 1 when a person sits on the seat 1.

In the present invention, the left motor 23 and the right motor 33 which have speed and position feedback functions can be connected by the motor controller, so that the left slide rail 2 and the right slide rail 3 can be controlled to move at the respective specified speed, and the position of the slide rail is recorded. The present invention achieves the following functions:

1) The left slide rail 2 and the right slide rail 3 move precisely in the same direction, that is, the seat 1 is moved either frontwards or backwards.

2) The left slide rail 2 and the right slide rail 3 move in an opposite direction, that is, the seat 1 is rotated.

3) The welcoming slide rail has a memory function, and can return to specified front and rear positions and a rotation angle.

4) The welcoming slide rail has adjusting functions of rapid and slow speeds, rotates slowly when manned, and rotates quickly when unmanned.

Figure 5:
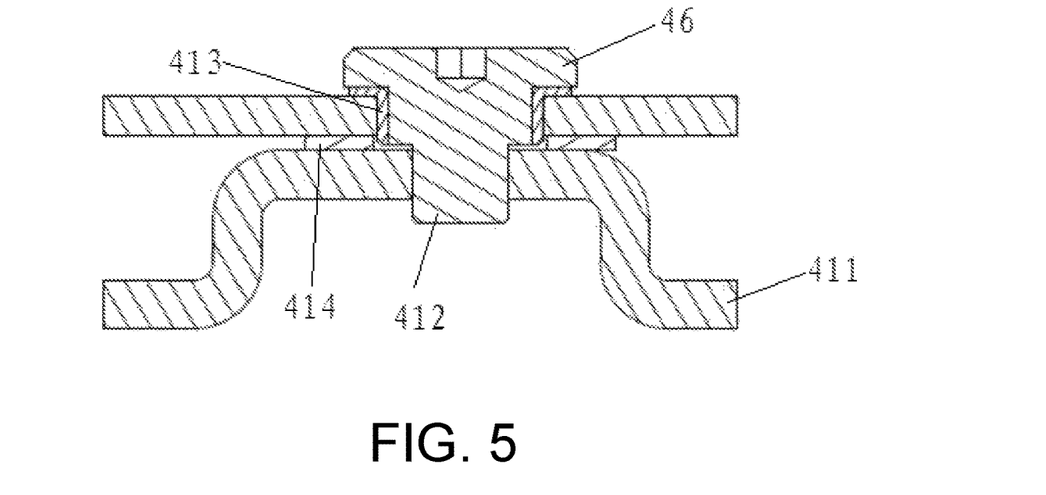
FIG. 5 is a partial schematic diagram of a first main rotation point of a rotating mechanism of a welcoming slide rail of the present invention.

Specifically, the first rotating mechanism of the present invention includes a first step bolt 412, a first chuck bushing 413, and a first gasket 414; the first step bolt 412 passes through the wall plate 46 and the first gasket 414 in sequence and is connected to the first bracket 411, and the first chuck bushing 413 is arranged between the wall plate 46 and the first step bolt 412.

Figure 6:
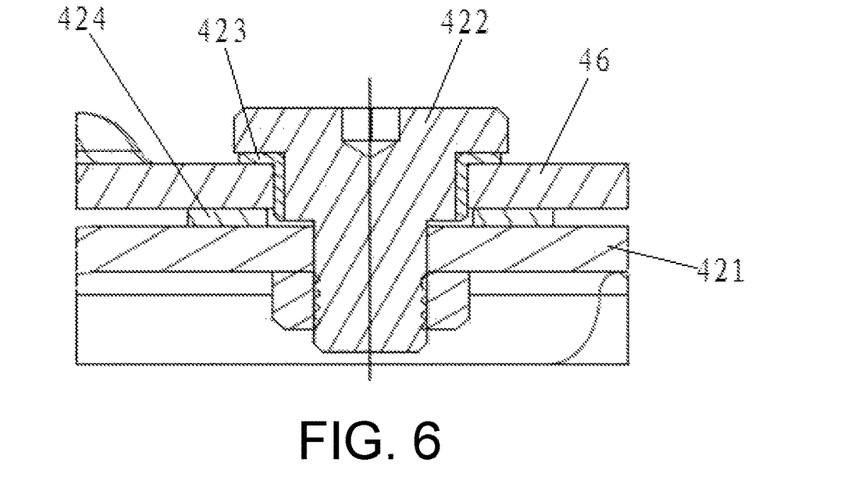
FIG. 6 is a partial schematic diagram of a second main rotation point of a rotating mechanism of a welcoming slide rail of the present invention.

The second rotating mechanism includes a second step bolt 422, a second chuck bushing 423, a second gasket 424, and a first nut 425; the second step bolt 422 is connected to the first nut 425 after passing through the wall plate 46, the second gasket 423, and the second bracket 421 in sequence, and the second chuck bushing 423 is arranged between the wall plate 46 and the second step bolt 422.

Figure 7:
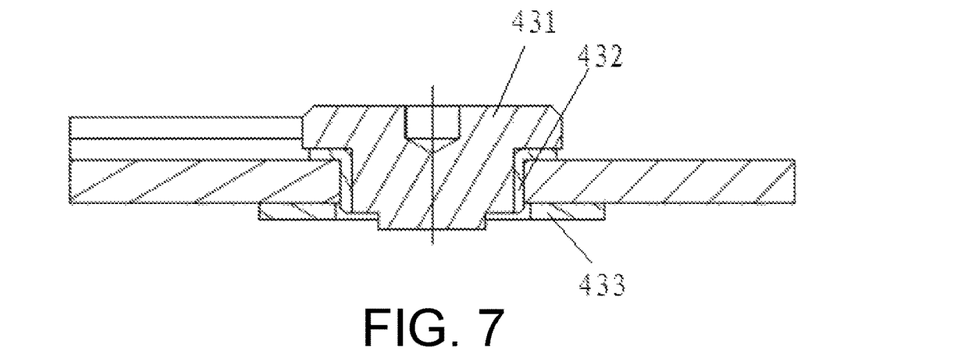
FIG. 7 is a partial schematic diagram of a third main rotation point of a rotating mechanism of a welcoming slide rail of the present invention.

The third rotating mechanism includes a third step bolt 431, a third chuck bushing 432, and a third gasket 433; the third step bolt 431 is connected to the right upper rail 31 after passing through the second bracket 421 and the third gasket 433 in sequence, and the third chuck bushing 432 is arranged between the second bracket 421 and the third step bolt 431.

Figure 8:
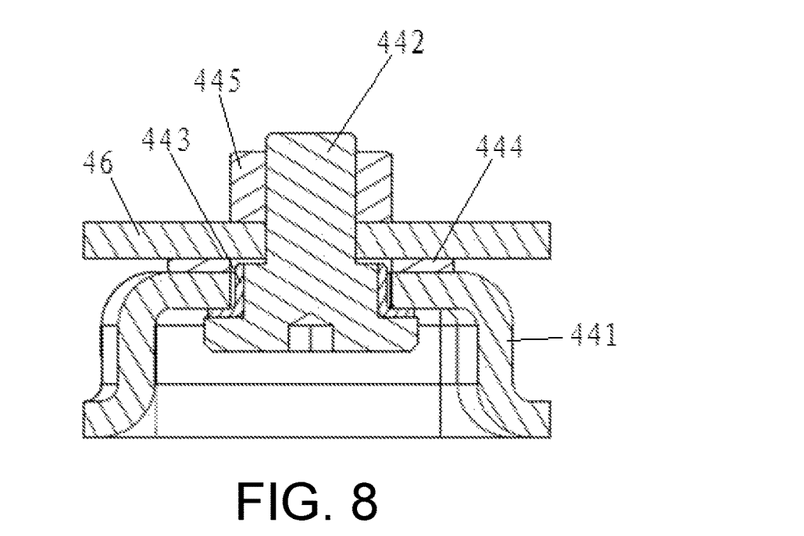
FIG. 8 is a partial diagram of a first auxiliary supporting point of a rotating mechanism of a welcoming slide rail of the present invention.

The fourth rotating mechanism includes a fourth step bolt 442, a fourth chuck bushing 443, a fourth gasket 444, and a second nut 445; the fourth step bolt 442 is connected to the second nut 445 after passing through the third bracket 441, the fourth gasket 444, and the wall plate 46 in sequence, and the fourth chuck bushing 443 is arranged between the third bracket 441 and the fourth step bolt 442.

Figure 9:
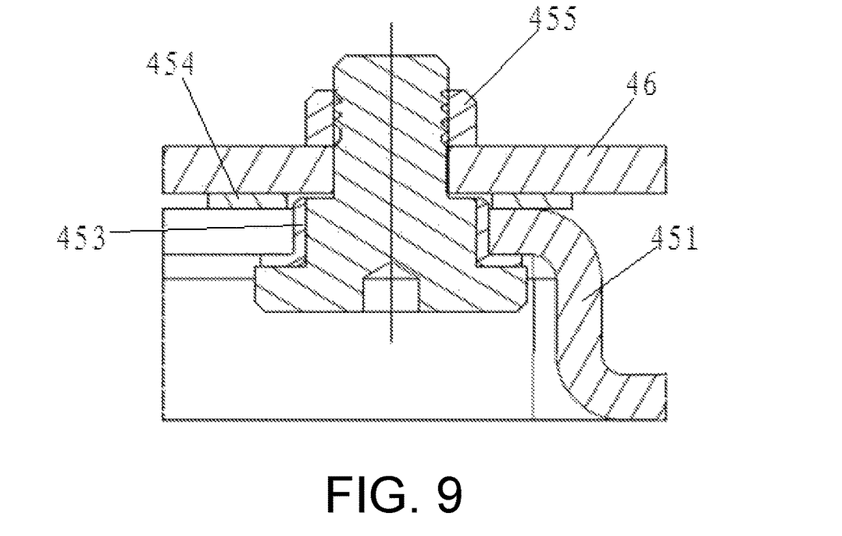
FIG. 9 is a partial schematic diagram of a second auxiliary supporting point of a rotating mechanism of a welcoming slide rail of the present invention.

The fifth rotating mechanism includes a fifth step bolt 452, a fifth chuck bushing 453, a fifth gasket 454 and a third nut 455; the fifth step bolt 452 is connected to the third nut 455 after passing through the fourth bracket 451, the fifth gasket 454, and the wall plate 46 in sequence, and the fifth chuck bushing 453 is arranged between the fourth bracket 451 and the fifth step bolt 452.

In the present invention, in order to reduce a frictional resistance, the first to fifth rotating mechanisms all need to use the chuck bushing and the gasket, which can reduce a frictional force in a slide movement, improve durability, and eliminate abnormal noise.

Figure 10:
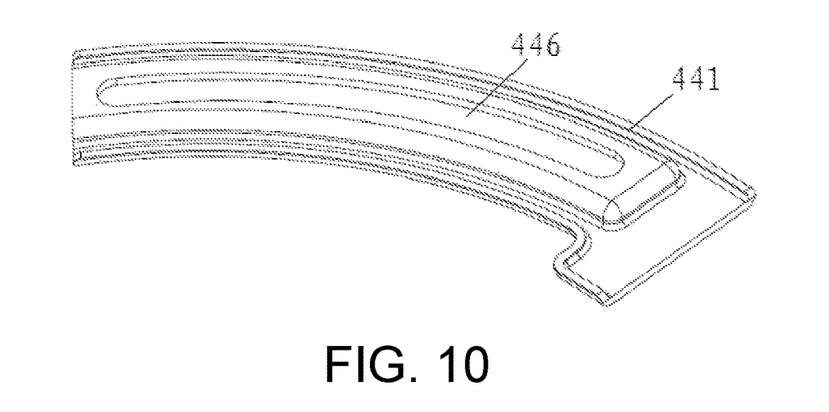
FIG. 10 is a schematic structure diagram of a third bracket of a rotating mechanism of a welcoming slide rail of the present invention.

Preferably, a first curved slide chute 446 is provided inside the third bracket 441, and the fourth step bolt 442 passes through and is arranged in the first curved slide chute 446. The first curved slide chute 446 is a curve with special movement, which provides movement guidance, rigidity and strong support for the first auxiliary supporting point 44 during rotation.

Figure 11:
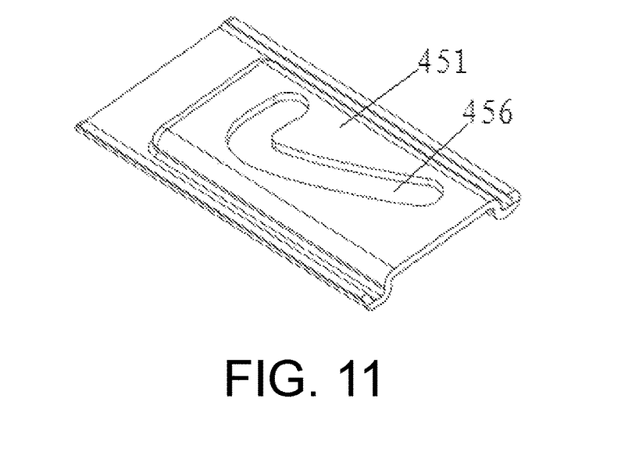
FIG. 11 is a schematic structure diagram of a fourth bracket of a rotating mechanism of a welcoming slide rail of the present invention.

More preferably, a second curved slide chute 456 is provided inside the fourth bracket 451, and the fifth step bolt 452 passes through and is arranged in the second curved slide chute 456. The second curved slide chute 456 is a curve with special movement, which provides movement guidance, rigidity, and strong support for the second auxiliary supporting point 45 during rotation.

What is claimed is:

1. A welcoming slide rail, mounted at a bottom of a seat, the slide rail comprising:
    a slide rail assembly, comprising a left slide rail and a right slide rail, the left slide rail comprising a left upper rail and a left lower rail, the right slide rail comprising a right upper rail and a right lower rail, the left upper rail and the left lower rail being in sliding connection by a left motor, and the right upper rail and the right lower rail being in sliding connection by a right motor; and
    a rotating mechanism, comprising a wall plate, first, second and third main rotation points, and first and second auxiliary supporting points, the wall plate being fixedly connected to the bottom of the seat; the first main rotation point comprises a first bracket and a first rotating mechanism, a lower part of the first bracket being connected to the left upper rail, an upper part of the first bracket being rotatably connected to the wall plate via the first rotating mechanism; the second main rotation point comprises a second bracket and a second rotating mechanism, a lower part of the second bracket being rotatably connected to the right upper rail, one side of an upper part of the second bracket being rotatably connected to the wall plate via the second rotating mechanism; the third main rotation point comprises a third rotating mechanism, an other side of the upper part of the second bracket being rotatably connected to the right upper rail via the third rotating mechanism; the first auxiliary supporting point comprises a third bracket and a fourth rotating mechanism, a lower part of the third bracket being connected to the left upper rail, an upper part of the third bracket being rotatably connected to the wall plate via the fourth rotating mechanism; the second auxiliary supporting point comprises a fourth bracket and a fifth rotating mechanism, a lower part of the fourth bracket being connected to the right upper rail, and an upper part of the fourth bracket being rotatably connected to the wall plate via the fifth rotating mechanism;
    when running speeds of the left motor and the right motor are consistent, the seat moves forward or backward in parallel along the slide rail assembly; when a backward speed of the left motor is less than a backward speed of the right motor, the second bracket moves backwards, driving the third main rotation point and the second main rotation point to move backwards, at the same time, the second bracket starts to rotate around the third main rotation point, and a distance of the second bracket from the first main rotation point is gradually made larger, so that the wall plate is driven to start to rotate counterclockwise around the second main rotation point, and the first and second auxiliary supporting points move along the third bracket and the fourth bracket respectively, so that the seat is rotated relative to the slide rail assembly to a set angle.

2. The welcoming slide rail according to claim 1, wherein the first rotating mechanism comprises a first step bolt, a first chuck bushing, and a first gasket; the first step bolt passes through the wall plate and the first gasket in sequence and is connected to the first bracket, and the first chuck bushing is arranged between the wall plate and the first step bolt.

3. The welcoming slide rail according to claim 1, wherein the second rotating mechanism comprises a second step bolt, a second chuck bushing, a second gasket and a first nut; the second step bolt is connected to the first nut after passing through the wall plate, the second gasket, and the second bracket in sequence, and the second chuck bushing is arranged between the wall plate and the second step bolt.

4. The welcoming slide rail according to claim 1, wherein the third rotating mechanism comprises a third step bolt, a third chuck bushing, and a third gasket; the third step bolt is connected to the right upper rail after being passed through the second bracket and the third step bolt in sequence, and the third chuck bushing is arranged between the second bracket and the third step bolt.

5. The welcoming slide rail according to claim 1, wherein the fourth rotating mechanism comprises a fourth step bolt, a fourth chuck bushing, a fourth gasket, and a second nut; the fourth step bolt is connected to the second nut after passing through the third bracket, the fourth gasket, and the wall plate in sequence, and the fourth chuck bushing is arranged between the third bracket and the fourth step bolt.

6. The welcoming slide rail according to claim 1, wherein the fifth rotating mechanism comprises a fifth step bolt, a fifth chuck bushing, a fifth gasket, and a third nut; the fifth step bolt is connected to the third nut after passing through the fourth bracket, the fifth gasket, and the wall plate in sequence, and the fifth chuck bushing is arranged between the fourth bracket and the fifth step bolt.

7. The welcoming slide rail according to claim 1, wherein a first curved slide chute is provided inside the third bracket, and the fourth step bolt passes through and is arranged in the first curved slide chute.

8. The welcoming slide rail according to claim 7, wherein a second curved slide chute is provided inside the fourth bracket, and the fifth step bolt passes through and is arranged in the second curved slide chute.

9. The welcoming slide rail according to claim 1, a set angle of the seat rotated relative to the slide rail assembly is 0-45°.

10. The welcoming slide rail according to claim 1, wherein the left motor and the right motor are both connected to a motor controller, the motor controller is configured to control the left motor and the right motor to act synchronously or independently, and the left motor and the right motor have speed and position feedback functions.

* * * * *